Oct. 25, 1966
J. BREAN
3,281,830
OPTICAL ENCODER
Filed Feb. 7, 1964
7 Sheets-Sheet 1
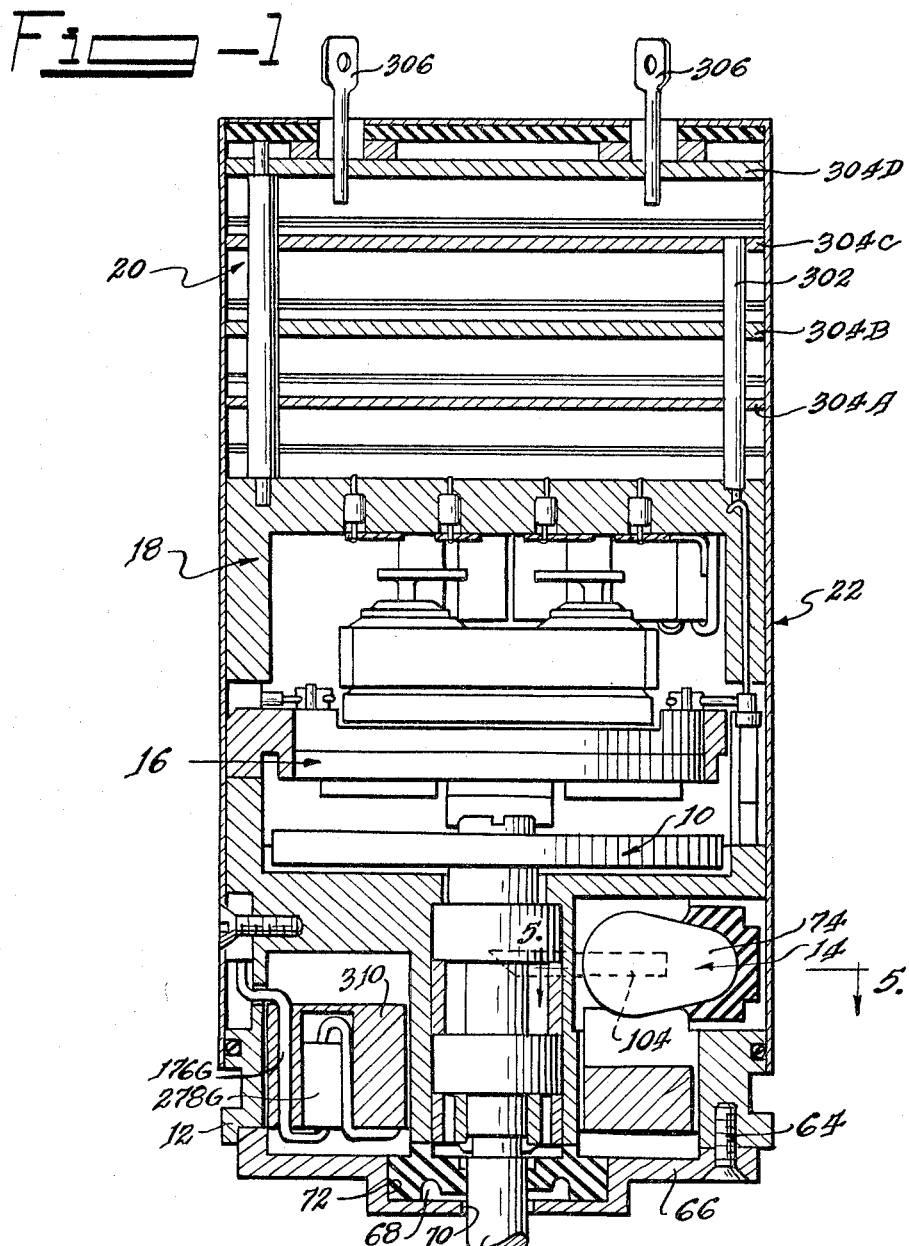
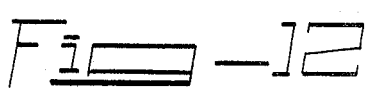
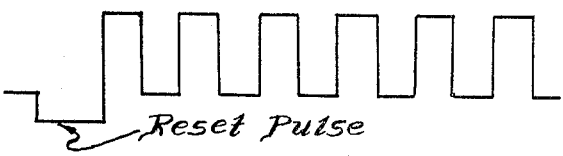

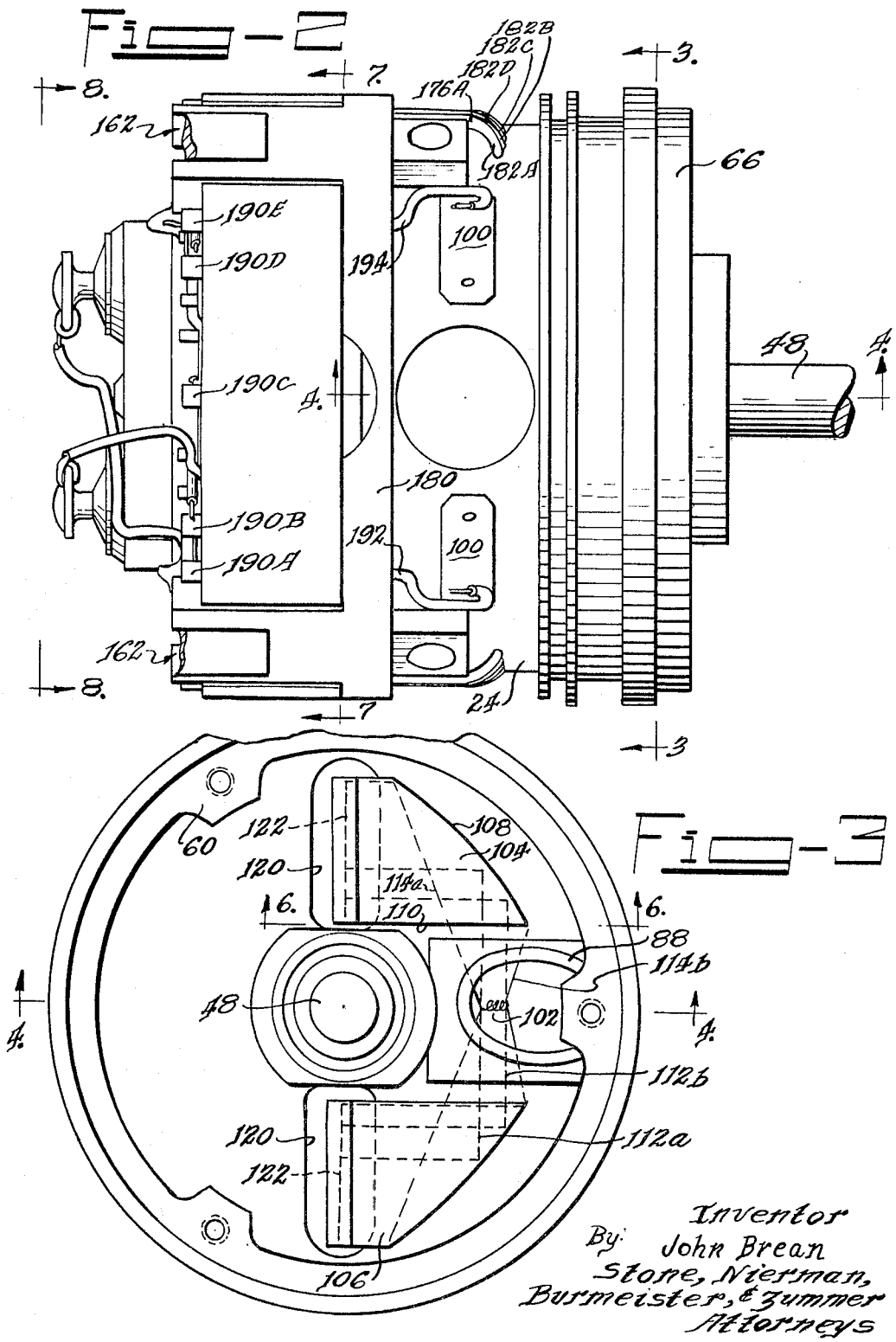

Oct. 25, 1966 J. BREAN 3,281,830
OPTICAL ENCODER
Filed Feb. 7, 1964 7 Sheets-Sheet 3
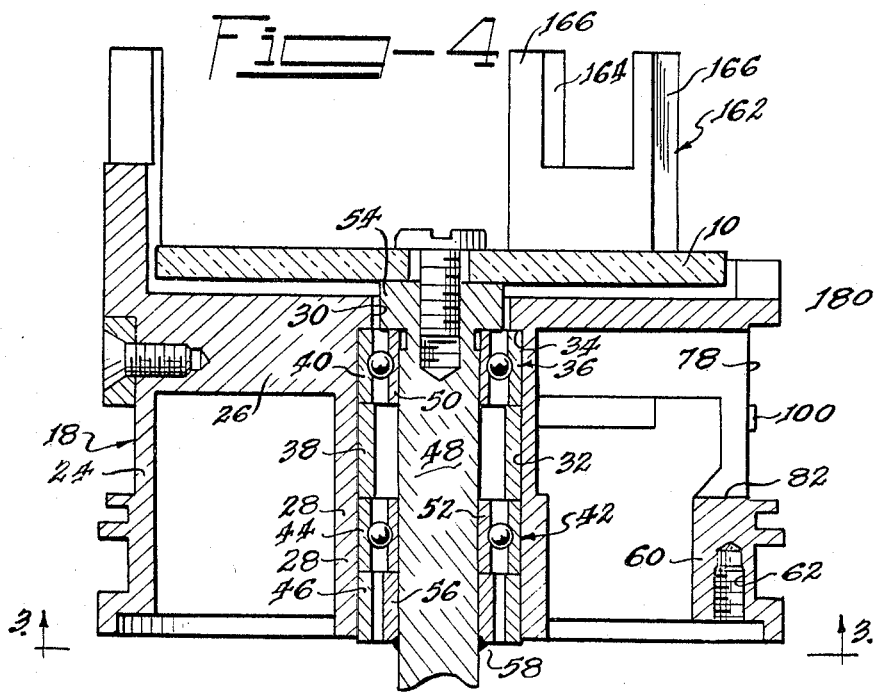
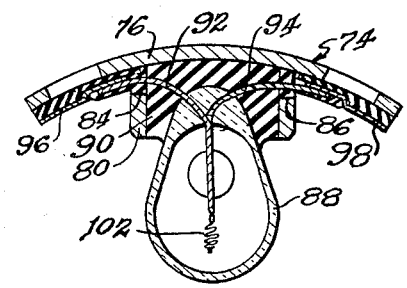
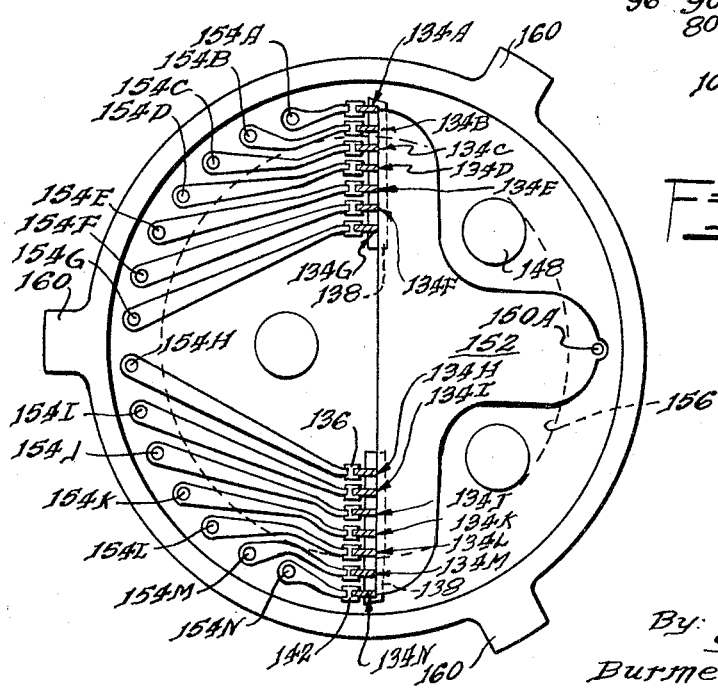
Inventor
John Brean
By Stone, Nierman,
Burmeister & Zummer
Attorneys

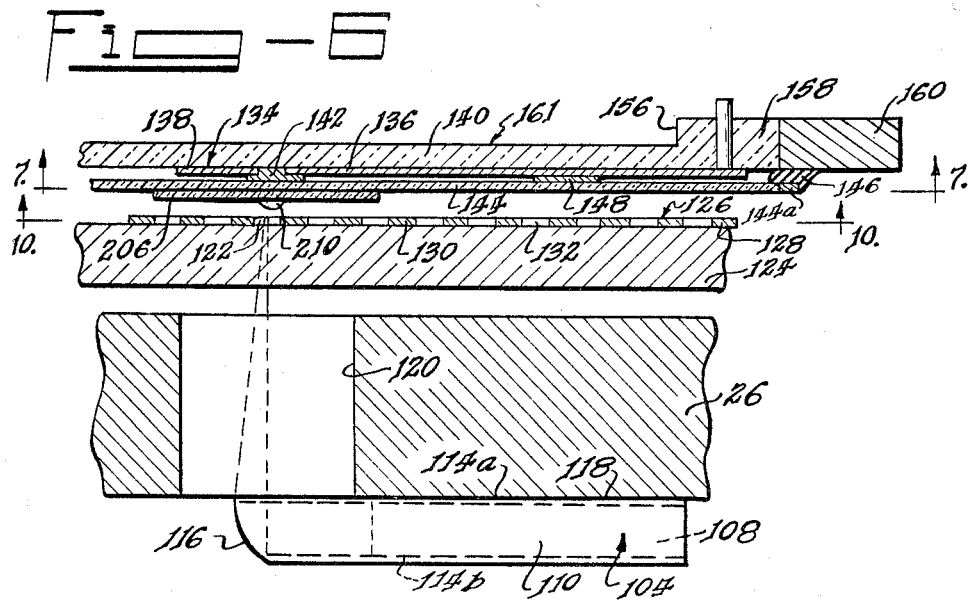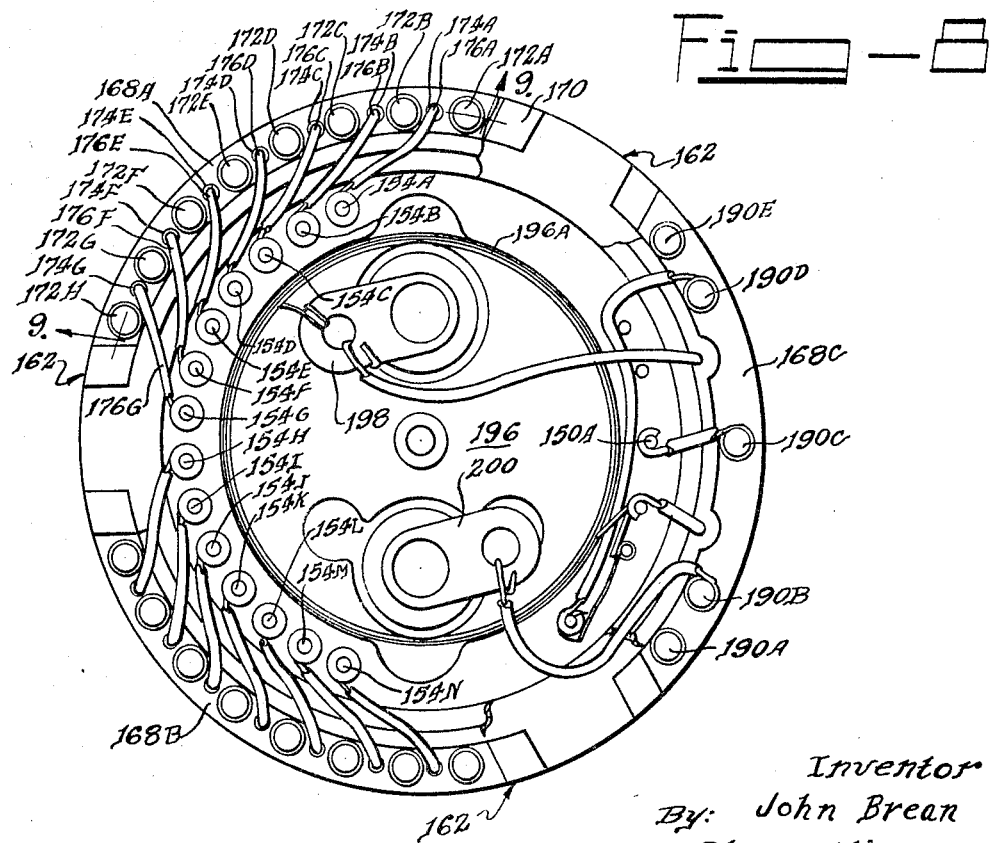

Oct. 25, 1966 J. BREAN 3,281,830
OPTICAL ENCODER
Filed Feb. 7, 1964 7 Sheets-Sheet 5
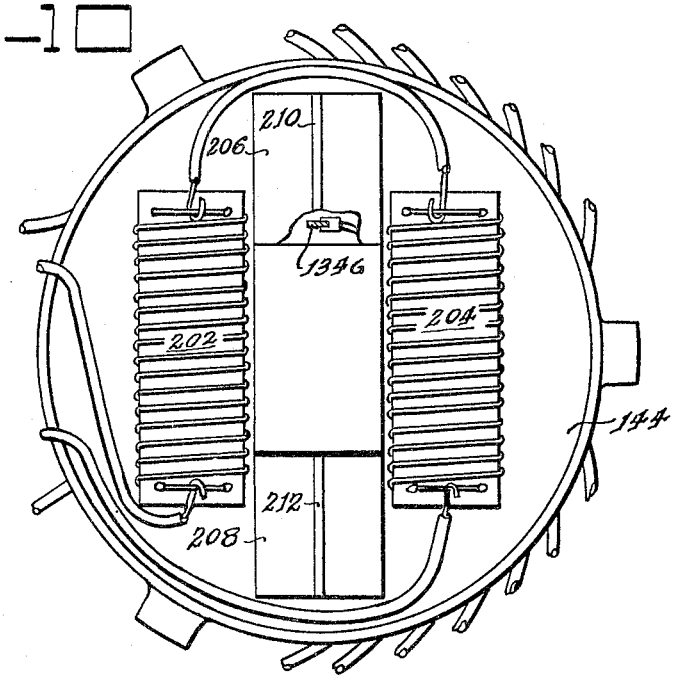
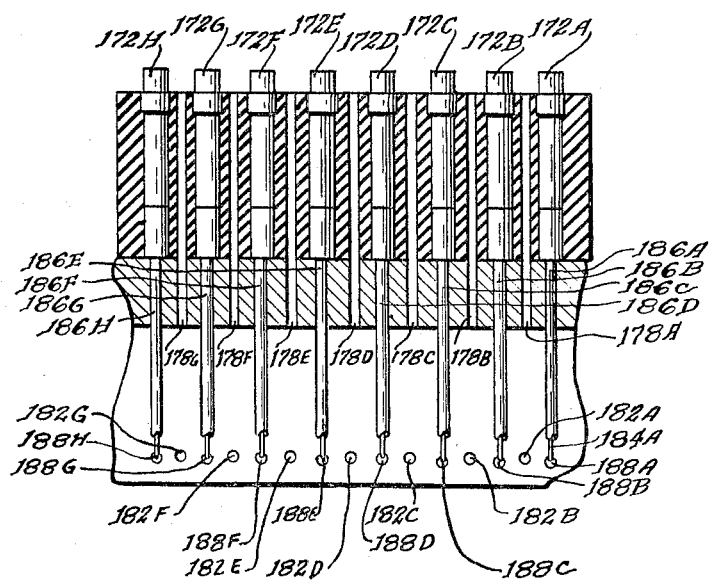
Inventor
John Brean
By Stone, Nierman,
Burmeister, & Zummer
Attorney Oct. 25, 1966   J. BREAN   3,281,830
OPTICAL ENCODER
Filed Feb. 7, 1964   7 Sheets-Sheet 6
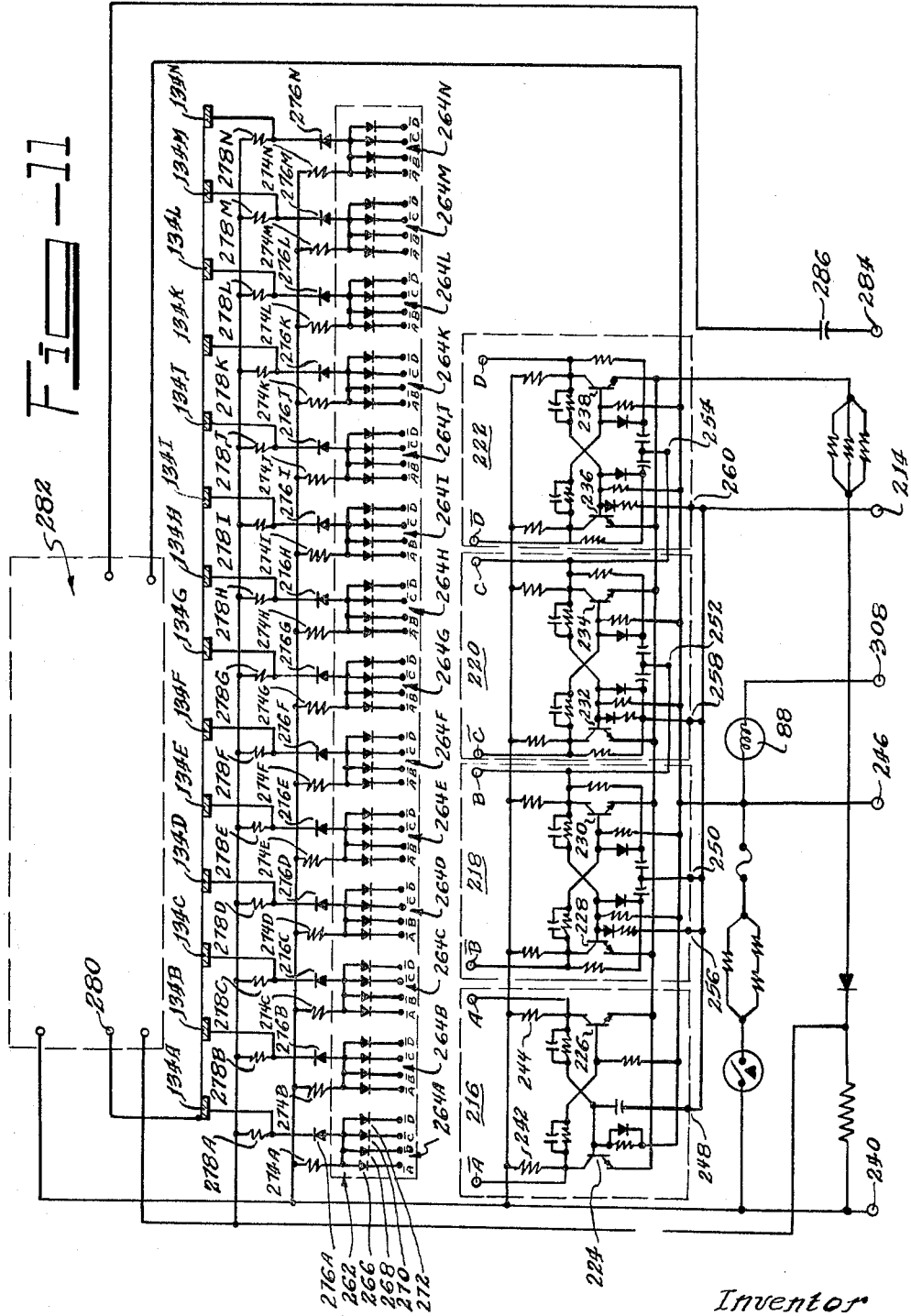
Inventor
John Brean
By Stone, Nierman,
Burmeister & Zummer
Attorneys

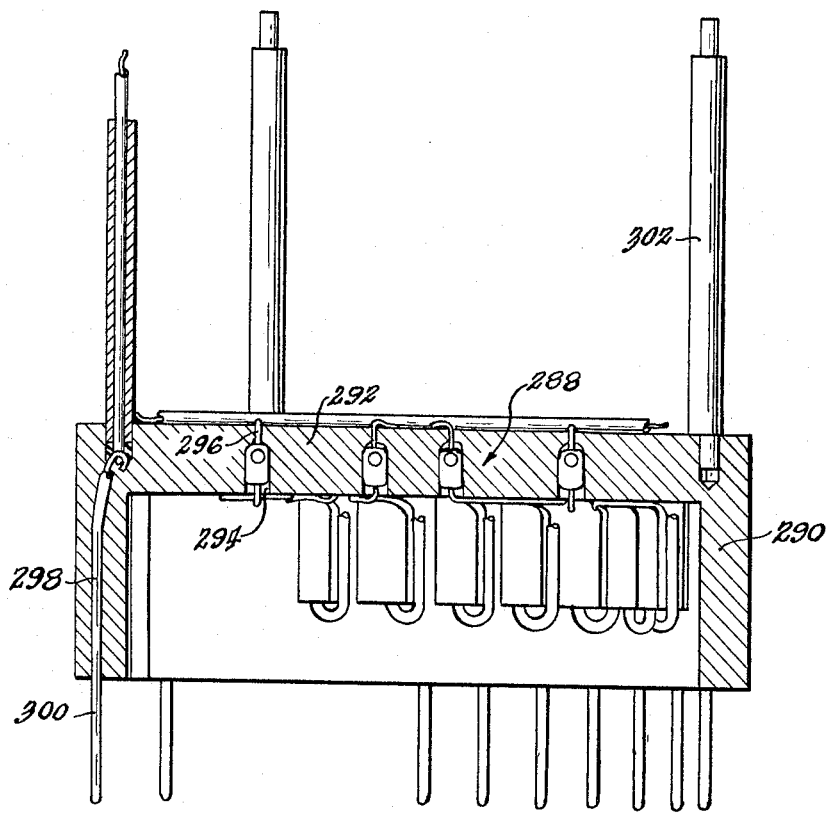

United States Patent Office 3,281,830
Patented Oct. 25, 1966

3,281,830
OPTICAL ENCODER
John Brean, Cincinnati, Ohio, assignor to D. H. Baldwin Company, Cincinnati, Ohio, a corporation of Ohio
Filed Feb. 7, 1964, Ser. No. 343,245
15 Claims. (Cl. 340—347)

The present invention relates generally to devices for digitally encoding the angular position of a shaft. In particular, the present invention relates to optical devices for encoding shaft angular positions.

Generally, an optical encoder employs a code disc mounted to rotate on a shaft, and the analog information to be encoded is impressed upon the rotatable shaft. The code disc is provided with one or more annular tracks of opaque and transparent segments coaxially disposed about the center of the code disc. A lamp is disposed adjacent to one side of the code disc, and a photocell is mounted confronting each of the tracks on the opposite side of the code disc.

The positon of the code disc is periodically determined by either flashing the lamp and noting the electrical response of the photocells, or employing a constantly illuminated lamp and periodically actuating the photocells to generate an indication of the presence or absence of illumination on each photocell. The presence or absence of illumination on each photocell may be determined simultaneously or in sequence as more fully explained in Patent No. 3,023,406 of E. M. Jones entitled Optical Encoder, dated February 27, 1962.

Prior to the present invention, the diameter of shaft position encoders has been directly related to the resolution of the encoder, that is the number of divisions of the encoder per revolution of the shaft. The volume of such encoders have been related to both the resoution of the encoder and the complexity of the electronics disposed within the encoder casing or housing. For example, the smallest prior thirteen digit encoder provided with an electronics package within the housing to achieve an adequate output was approximately 2.6 inches in diameter and 3.0 inches in length. It is an object of the present invention to provide an optical encoder for shaft positions which may be fabricated in smaller sizes than prior optical encoders.

The optical encoder described in the following specification is an equivalent thirteen digit encoder which has been constructed with an adequate electronics package in a volume less than two fifths of the diameter of the smallest known prior equivalent encoder and which has a volume of about 0.1 of the volume of the prior encoder. The encoder described in this specification is housed in a package of the dimensions of a size 11 synchro, namely, a diameter of 1.1 inch and a length of 2.0 inches. The encoder achieves a resolution of 8192 divisions (13 binary digits) and operates in the sequential mode at rates up to 1,000,000 digits per second.

It is thus an object of the present invention to provide an optical encoder of a construction which optimizes the utilization of space and which minimizes the diameter of the encoder for a given resolution.

In addition, it is an object of the present invention to provide an optical encoder which may be readily disassembled for repair and in which both the mechanical and electrical components are accessible for adjustment, correction, or replacement.

The foregoing objects and advantages of the present invention will be more fully appreciated from a further consideration of this specification, particularly when viewed in the light of the drawings, in which:

FIGURE 1 is an axial sectional view of an analog to digital encoder constructed according to the teachings of the present invention, some details having been omitted for clarity;

FIGURE 2 is an elevational view of the photocell assembly and housing of the encoder illustrated in FIGURE 1, the cover having been removed;

FIGURE 3 is an end elevational view taken along the line 3—3 of FIGURE 2 or the line 3—3 of FIGURE 4, the plate having been removed for clarity;

FIGURE 4 is a fragmentary sectional view of the encoder taken along the line 4—4 of FIGURE 3 or the line 4—4 of FIGURE 2;

FIGURE 5 is a sectional view of the lamp assembly for the encoder taken along the line 5—5 of FIGURE 1;

FIGURE 6 is a sectional view taken along the line 6—6 of FIGURE 3;

FIGURE 7 is a fragmentary sectional view taken along the line 7—7 of FIGURE 6 or the line 7—7 of FIGURE 2;

FIGURE 8 is a plan view of the portion of the encoder illustrated in FIGURE 2 taken along the line 8—8 of FIGURE 2;

FIGURE 9 is a fragmentary sectional view taken along the line 9—9 of FIGURE 8;

FIGURE 10 is a plan view taken along the line 10—10 of FIGURE 6;

FIGURE 11 is a schematic electrical circuit diagram of the optical encoder of FIGURES 1 through 10;

FIGURE 12 is a curve showing the input interrogating pulse train for the encoder; and FIGURE 13 is a sectional view of the diode matrix board assembly in greater detail than illustrated in FIGURE 1.

As illustrated in FIGURE 1, the analog to digital encoder has a code disc 10 mounted on a housing 12 which also mounts a lamp and optical system 14. A photocell assembly 16 is mounted on the housing 12 on the side of the code disc 10 opposite the lamp and optical system 14, and an electrical interrogation means 18 is mounted on the remote side of a photocell assembly 16 from the code disc 10. The encoder is designed to operate from an interrogating pulse train which is received as an input and which will be more thoroughly described hereinafter, and an electronics package 20 is mounted on the interrogation means for the purpose of controlling the interrogation means in response to the input interrogating pulse train and for the purpose of amplifying the signal from the photocell assembly 16 to a useable level. The entire assembly from the housing 12 including the lamp and optical system 14, the photocell assembly 16, the interrogation means 18, and the electronics package 20 are disposed within a cylindrical cover 22 which is mounted on the housing 12. It is to be noted that FIGURE 1 illustrates the encoder in somewhat simplified form for purposes of clarity, and that certain details not shown in FIGURE 1 are presented hereafter and described with reference to other figures.

FIGURES 2 through 4 illustrate the housing construction in greater detail than set forth in FIGURE 1. This housing 12 has a cylindrical shell 24 and a wall 26 which extends across the shell normal to the axis thereof. The wall 26 is provided with a cylindrical sleeve 28 which extends coaxially within the shell 24 about the axis thereof and is aligned with and communicates with a circular opening 30 in the wall 26 located on the axis of the shell 24. The opening 30 and sleeve 28 form a cylindrical channel 32 which has a shoulder 34 adjacent to the opening 30. A first cylindrical ball bearing assembly 36 is disposed within the channel 32 and mounted in abutment with the shoulder 34. A cylindrical spacer having an outer diameter approximately equal to the diameter of the channel 32 abuts the outer race 40 of the ball bearing assembly 36 and is secured in the bore 32 of the sleeve 28 to secure the ball bearing assembly 36 in position. A second ball bearing assembly 42 has an outer race 44 disposed within the sleeve 28 in abutment with the end of the spacer 38 opposite the ball bearing assembly 36, and a second spacer 46 cylindrical in form mounted on the interior surface of the channel 32 on the side of the outer race 44 opposite the spacer 38 secures the ball bearing assembly 42 firmly in position.

A shaft 48 extends through and is mounted on the inner race 50 of the ball bearing assembly 36 and the inner race 52 of the ball bearing assembly 42. The shaft 48 has a head 54 of greater diameter than other portions of the shaft 48, and the head 54 engages the confronting surface of the inner race 50 of the ball bearing assembly 36. The shaft 48 is slidable within the inner race 50 of the ball bearing assembly 36 and within the inner race 52 of the ball bearing assembly 42, but the shaft is secured on a spacer sleeve 56 which is coaxially disposed about the shaft 48 on the side of the ball bearing assembly 42 remote from the ball bearing assembly 36 by a ring 58 of cement. The sleeve 56 engages only the inner race 52 of the ball bearing assembly 42, and the head 54 engages only the inner race 50 of the ball bearing assembly 36. In assembling the ball bearing assemblies 36 and 42 on the shaft 48, a slight pressure forcing the inner races 50 and 52 toward each other is permanently established, for example two pounds per square inch. In this manner, the ball bearing assemblies 36 and 42 are preloaded to eliminate play in the bearings and to maintain rotation of the shaft 48 in precision alignment with the axis of the shell 24.

The shell 24 is provided with a plurality of inwardly extending protrusions 60, three in the particular construction described in this application, and the protrusions 60 are provided with threaded bores 62 which engage threaded screws 64 (FIGURE 1) which mount a cover plate 66 on the shell 24. The cover plate 66 has a recess 68 (FIGURE 1) extending from the interior surface thereof coaxially about the shaft 48 and a circular opening 70 extending about the shaft 48 to permit the shaft to rotatably extend to the exterior of the housing 12. A circular dust seal constructed of compliant material, such as plastic or rubber, designated 72, is disposed within the recess 68 and engages the confronting surface of the shaft 48 to seal the interior of the housing 12 from dust and dirt particles present in the ambient atmosphere.

The lamp and optical system 14 is also mounted within the shell 24 (FIGURE 1). FIGURES 2 and 4 illustrate the encoder with the lamp assembly removed, but FIGURE 1 illustrates the lamp assembly, designated 74, in position, and FIGURE 5 illustrates the details of the lamp assembly 74. The lamp assembly 74 has a curved plate 76. The plate 76 has a pair of parallel edges in the plane of FIGURE 5, and is curved to fit in a groove 78 which is disposed in the exterior surface of the shell 24 ajacent to the wall 26 and extends about the entire perimeter of the shell 24. An inwardly protruding circular collar 80 extends from the central portion of the plate 76 and has a diameter approximately equal to the diameter of a circular aperture 82 in the shell 24 disposed centrally within the groove 78. The collar 80 has a pair of small apertures 84 and 86 which extend therethrough on opposite sides thereof in the circular groove 78, and a lamp 88 is mounted in the collar 80 by means of an epoxy cement layer 90. The two terminal wires 92 and 94 extend through the apertures 84 and 86, respectively, and are anchored at their ends opposite the lamp 88 on electrical contact plates 96 and 98 disposed on the interior side of the plate 76. Each of the contact plates 96 and 98 abuts an electrical terminal 100 protruding from the surface of the shell 24 within the groove 78 and adjacent to the aperture 82. The contact terminals are electrically connected to a source of direct current, not illustrated. The lamp 88 is an incandescent lamp and has a filament 102 disposed approximately on the axis of the cylindrical collar 80. The position of the lamp 88 is maintained by virtue of the close fit between the collar 80 and the aperture 82 in the shell 24 and by abutment of the edges of the plate 76 against the edges of the grooves 78 in the shell 24. In addition, the plate 76 is maintained in abutment with the surface of the groove 78 by the cover 22 which extends over the groove 78 as illustrated in FIGURE 1.

Light from the lamp 88 is focused on the code disc 16 by two mirrors or prisms designated 104 and 106. FIGURES 3 and 6 best illustrate the optical system of the encoder. The prism 104 is illustrated in FIGURE 6 as mounted on the lower surface of the wall 26, as by cement. It will be noted from FIGURE 3 that the prism 104 has a curved exterior convex surface 108 parallel to the axis of the shaft 48 and that this surface is remote from a flat surface 110 parallel to the axis of the shaft 48 and also parallel to the axis of the filament 102 of the lamp 88. The flat surface 110 immediately confronts the lamp 88, and the convex surface 108 is on the opposite side of the flat surface 110 from the lamp 88 so that light rays entering the prism 104 will enter through the flat surface 110 and be reflected from the interface of the more dense material of the prism and the less dense atmosphere exterior of the prism when the rays reach the curved surface 108 at an angle in excess of the critical angle for the material of the prism 104. FIGURE 3 illustrates the path of the two rays 112a and 112b which extend from opposite ends of the filament 102 perpendicular to the axis of the filament and illustrates that these rays are reflected from the convex surface 108 parallel to each other and parallel to the flat surface 110. In like manner, those rays from the filament 102 which impinge upon the ends of the convex surface 108, designated 114a and 114b also are reflected by the convex surface 108 to a direction parallel with the flat surface 110.

As illustrated in FIGURE 6, the prism 104 has a second convex surface 116 at the end opposite the convex surface 108 which is convex about an axis normal to the flat surface 110 and normal to the axis of convexity of the surface 108. Rays traveling parallel to the flat upper surface, designated 118 in FIGURE 6, are reflected from the convex surface 116 to pass through a slot 120 in the wall 26 to impinge upon the code disc 10. All light rays traveling parallel to the surface 118 of the prism 104 are reflected by the convex surface 116 to focus on a point disposed in the plane of the upper surface of the code disc 10. For illustrative purposes, it is assumed that the ray 114b illustrated in FIGURE 3 enters the flat surface 110 of the prism 104 adjacent to the surface remote from the flat surface 118 and is reflected from a point on the convex surface 116 adjacent to the flat surface remote from the surface 118 to focus on the point designated 122 in the plane of the upper surface of the code dics 10. Also, the ray 114a is illustrated as entering the prism 104 adjacent to the flat surface 118 and being reflected by the convex surface 116 to focus on the point 122.

The prism 106 is a mirror image of the prism 104, and hence two lines of light pass through the slots 120 located on opposite sides of the shaft 48 and are disposed in a line with the axis of the shaft 48. The two lines of light are represented by the focal line 122 in FIGURE 6 and are disposed in the plane of the upper surface of the code disc 10.

The code disc 10 has a circular flat glass plate 124 which is provided with a coating 126 on its surface remote from the wall 26, and this coating 126 is provided with a plurality of tracks, one of which is illustrated in FIGURE 6 and designated 128, which consists of alternating opaque sectors 130 and transparent sectors 132. The tracks 128 are coaxial about the shaft 48.

The focal lines 122 are disposed on a diameter of the code disc 10, and the photocell assembly 16 positioned adjacent to the code disc 10 has two rows of photocells 134 confronting the code disc 10 and aligned with the two focal axes 122. FIGURE 6 illustrates one of the photocells 134 confronting the track 126, and an identical photocell confronts each of the other tracks of the code disc. In the particular construction described throughout this specification, the encoder disc 10 has fourteen tracks and fourteen photocells, thirteen of the tracks having alternate transparent and opaque sectors as illustrated, and the fourteenth track being nearest to the axis of the shaft 48 and being entirely transparent. The innermost transparent track is for the purpose of providing a reference signal indicating the brilliance of the light source in accordance with the teachings of Patent No. 3,023,406 of Edward M. Jones, issued February 27, 1962. Each of the photocells 134 has a pair of electrically conducting electrodes 136 and 138 mounted on a base plate 140 of electrically insulating material. A mass 142 of semiconductive material is disposed between the electrodes 136 and 138, and a transparent cover plate 144 which is circular in form is sealed about its metal perimeter 144a by a layer of solder 146. Three circular wafers 148 space the cover plate 144 from the electrodes 136, 138. Both the cover plate 144 and the base 140 are constructed of glass, the base because of the electrically insulating properties of glass and the cover plate because of its transparency.

As best illustrated in FIGURE 7, one of the electrodes 138 of each of the cells located on one side of the axis 48 of the encoder, designated 134A, 134B, 134C, 134D, 134E, 134F, and 134G, is in the form of a common strip of electrically conducting film disposed upon the base 140. In like manner, the photocells disposed upon the opposite side of the shaft 48, designated 134H, 134I, 134J, 134K, 134L, 134M, and 134N, have a common electrically conducting film in the form of a strip for the electrode 138. The two strips 138 of electrically conducting material are electrically connected to a pin 150A disposed adjacent to the perimeter of the base plate 140 by an electrically conducting film 152 disposed on the base plate 140 and partially over the two electrically conducting strips 138. The other electrode 136 of each of the photocells is connected to an individual terminal pin located adjacent to the perimeter of the base plate 140, the cell 134A being connected to terminal pin 154A, cell 134B being connected to terminal pin 154B, and cells 134C, 134D, 134E, 134F, 134G, 134H, 134I, 134J, 134K, 134L, 134M, and 134N, having their other electrode 136 connected to terminal pins 154C, 154D, 154E, 154F, 154G, 154H, 154I, 154J, 154K, 154L, 154M, and 154N, respectively. The base plate 140 has a recess 156 on its side opposite the photocells, and the pins extend through the circular flange 158 formed by the recess and protrude therefrom to permit electrical connection to the electrodes 136 and 138 of the photocells.

The base plate 140 has a metal perimeter 140a and three equally spaced tabs 160 extend outwardly from the perimeter 140a of the base plate 140 for mounting the base plate and photocell assembly on the housing 12. The housing 12 has three forks 162 which extend upwardly from the shell 24 and are equally spaced about the perimeter of the wall 26. The forks 162 are normal to the wall 26 and are provided with rectangular indentations 164 forming a pair of parallel legs 166. The photocell assembly 16 is positioned with the tabs 160 thereof disposed within the indentations 164 of the forks 162. The distance between the legs 166 of each fork exceeds the width of the tabs 160, thereby permitting the photocell assembly to be displaced rotationally a short distance to permit alignment of the photocell assembly with the focal axis 122 of the optical system. When alignment has been achieved, the photocell assembly is cemented in place on the forks 162 of the housing 12.

As best illustrated in FIGURES 2, 8, and 9, arcuate connectors 168A, 168B, and 168C are disposed between the forks 162 and form with the forks 162 a cylindrical surface. The arcuate connectors 168A, 168B, and 168C have a body 170 of electrically insulating material, and a plurality of electrically conducting sockets 172 are spaced along the perimeter of each of the arcuate connectors 168. The arcuate connector 168A has sockets 172A, 172B, 172C, 172D, 172E, 172F, 172G, and 172H and a cylindrical channel is disposed between the adjacent sockets and designated 174A, 174B, 174C, 174D, 174E, 174F, and 174G. Photocell terminal pin 154A is connected to an electrically conducting wire 176A having an electrically insulating coating which extends through the channel 174A and through a bore 178A in the outwardly extending flange 180 formed in the shell 24 of the housing 12 adjacent to the wall 26 to enter an aperture 182A which extends through the shell 24 for purposes which will be described hereinafter. In like manner, photocell pin 154B has a wire 176B which passes through the channel 174B in the flange 180 to enter an aperture 182B. In like manner, photocell terminal pins 154C, 154D, 154E, 154F, and 154G, are electrically connected to wires 176C, 176D, 176E, 176F, and 176G, which pass through channels 174C, 174D, 174E, 174F, and 174G, respectively, in the arcuate connector 168A and also through channels 178C, 178D, 178E, 178F, and 178G, in the flange 180. These wires in turn pass through apertures 182C, 182D, 182E, 182F, and 182G, respectively, in the shell 24.

In like manner, the socket 172A has a wire 184A which extends through a channel 186A in the flange 180 aligned with the socket 172, and the wire 184A passes through a bore 188A in the shell 24. Likewise, the socket 172B, 172C, 172D, 172E, 172F, 172G, and 172H have wires which pass through channels 186B, 186C, 186D, 186E, 186F, 186G, and 186H in the flange 180 and enter through bores 188B, 188C, 188D, 188E 188F, 188G, and 188H in the shell 24. The bores 182 and 188 are disposed in a common line, and the channels 186 and 178 are disposed in a common arcuate plane.

The arcuate connector 168B is identical to the arcuate connector 168A and will not be further described. The arcuate connector 168C is also constructed of electrically insulating material and has sockets 190A, 190B, 190C, 190D, and 190E extending therethrough. The socket 190A is connected to a wire 192 which is connected to one of the spring contacts 100 for the lamp assembly. The socket 190E is connected to a wire 194 which is connected to the other spring contact 100 of the lamp assembly, and the socket 190E is also interconnected with the socket 190D and forms a common or ground terminal for the encoder. The pin 150A of the photocell assembly is electrically connected to the socket 190C of the arcuate connector 168C and, as will be explained hereinafter, is electrically connected to the electronics package 20.

A heater and thermostat assembly 196 is disposed in the recess 156 of the photocell assembly and has terminals 198 and 200. Also, as illustrated in FIGURE 10, a pair of heaters 202 and 204 are disposed on the surface of the cover glass 144 of the photocell assembly 16 on opposite sides of the photocells 134. The two heaters 202 and 204 are connected in series and in parallel with the heater 196A. The purpose of the heaters 196A, 202, and 204 is to maintain the photoresistive cells 134 at a temperature within a narrow range.

The photocells 134 are constructed with masses 142 of photoconductive material and may be constructed in the manner described in the patent application of William B. Hugle, et al., Serial No. 791,400, now patent No. 3,187,414 filed February 5, 1959, entitled Photocells and Method of Manufacturing Photocells. The photoconductive mass 142 may comprise cadmium sulfide, lead sulfide, lead selenide, zinc selenide, zinc sulfide, zinc telluride, cadmium telluride, germanium, silicon, and lead telluride, and in the particular embodiment of this invention described throughout this specification cadmium selenide is utilized for the photoconductive mass. The electrodes 136 and 138 for the photocells 134 may comprise gold, silver, chromium, or Inconel, for example.

FIGURE 10 also illustrates a first mask block 206 positioned over photocells 134A, 134B, 134C, 134D, 134E, 134F, and 134G, carrying a semi-cylindrical lens 210 cemented on the surface of the mask block 206 in alignment with the focal axis 122 (FIGURE 6) of the optical system confronting these photoconductive cells. In like manner, a second semi-cylindrical lens 212 has its flat surface cemented on the flat surface of a second mask block 208 in alignment with the focal axis 122 confronting the cells 134H, 134I, 134J, 134K, 134L, 134M, and 134N (FIGURE 7). In this manner, the image of the code disc 10 is focused on the sensitive areas of the photocells in accordance with the teachings of Patent No. 2,941,088 of W. H. Mahaney, entitled Optical Encoder.

FIGURE 11 is a schematic circuit diagram illustrating the electrical circuits of the optical encoder described herein which are designed to respond to an input pulse train in the form illustrated in FIGURE 12. The input pulse train is impressed upon an input terminal 214 which is electrically connected to the input circuit of four flip-flops designated 216, 218, 220, and 222. The flip-flop 216 has two transistors 224 and 226 connected in a conventional transistor flip-flop circuit with output terminals designated $\bar{A}$ and A. In like manner, flip-flop 218 utilizes transistors 228 and 230 and has output terminals designated $\bar{B}$ and B. Also, flip-flop 220 has transistors 232 and 234 driving output terminals $\bar{C}$ and C. Also, flip-flop 222 utilizes transistors 236 and 238 to drive output terminals $\bar{D}$ and D. In each case, the collector of one of the transistors is connected to the output terminal and also to a positive source of potential through a voltage dropping resistor. For example, in flip-flop 216, the collector of transistor 224 is connected to the output terminal A and connected to a source of positive potential applied through a terminal 240 through a resistor 242. The transistor 226 has a collector connected to the output terminal A and to the terminal 240 through a resistor 244.

The input terminal of flip-flop 216 has been designated 248, the input terminal of flip-flop 218 has been designated 250, the input terminal of flip-flop 220 has been designated 252, and the input terminal of flip-flop 222 has been designated 254. The input terminals 248 and 250 of the flip-flops 216 and 218 are connected to the input terminal 214 and receive the pulse train illustrated in FIGURE 12. The input terminal 252 of flip-flop 220 is connected to the output terminal B of flip-flop 218, and the input terminal 254 of flip-flop 222 is connected to the output terminal C of flip-flop 220. Flip-flops 218, 220, and 222 have reset input terminals 256, 258, and 260, respectively, which are connected to the input terminal 214 and reset these flip-flops in response to the negative leading portion of the wave train of FIGURE 12. The flip-flop 216 is also reset to the same condition by the negative going initial pulse of the wave train, said reset or zero position causing transistors 224, 228, 232, and 236 to be cut off.

Flip-flops 216, 218, 220, and 222 form a four stage flip-flop counter. The positive going successive pulses of the input wave train illustrated in FIGURE 12 result in successive unique combinations of outputs on the output terminals $\bar{A}$, A, $\bar{B}$, B, $\bar{C}$, C, $\bar{D}$, D.

FIGURE 11 illustrates a switching matrix 262. The switching matrix 262 has fourteen sections designated 264A, 264B, 264C, 264D, 264E, 264F, 264G, 264H, 264I, 264J, 264K, 264L, 264M, and 264N. Each of these sections has four diodes designated 266, 268, 270, and 272, and these diodes have one terminal electrically interconnected and the other terminal connected to one of the outputs of one of the four flip-flops 216, 218, 220, and 222.

In the section 264A, the diode 266 has one of its terminals connected to the output terminal $\bar{A}$, the diode 268 has one of its terminals connected to the output $\bar{B}$, the diode 270 has one of its terminals connected to the output $\bar{C}$, and the diode 272 and has one of its terminals connected to the output $\bar{D}$. In like manner, the diodes of the groups 264B, 264C, 264D, 264E, 264F, 264G, 264H, 264I, 264J, 264K, 264L, 264M, and 264N have their output terminals connected to the output terminals of the flip-flops 216, 218, 220, and 222 indicated on the drawing of FIGURE 11. The diodes are all biased to pass positive charges in the direction of the flip-flops, and the common connected terminals of the diodes are connected to the positive power source terminal 240 through a resistor designated 274A, 274B, 274C, 274D, 274E, 274F, 274G, 274H, 274I, 274J, 274K, 274L, 274M, or 274N. The interconnected diodes of each group are also electrically connected to one of the photocells of the photocell assembly through a diode biased to pass positive charges in the direction of the photocell, that is, group 264A is connected to photocell 134A in series with diode 276A, group 264B is connected to photocell 134B through diode 276B, and groups 264C, 264D, 264E, 264F, 264G, 264H, 264I, 264J, 264K, 264L, 264M, and 264N of diodes are connected to their respective photocells through diodes 276C, 276D, 276E, 276F, 276G, 276H, 276I, 276J, 276K, 276L, 276M, and 276N, respectively. In addition, each of the photocells is connected to a positive potential lower than that of terminal 240 through a balancing resistor, the separate balancing resistors being designated 278A, 278B, 278C, 278D, 278E, 278F, 278G, 278H, 278I, 278J, 278K, 278L, 278M, and 278N. These resistors are selected to produce the same photocell current under the same conditions of illumination in spite of differences in photocell characteristics. The common electrode of each of the photocells is connected to the input terminal 280 of an amplifier 282, and the output of the amplifier 282 is connected to the output terminal 284 through a capacitor 286.

The balancing resistors are located about the bearing structure in the shell 24 of the housing 12. FIGURE 1 illustrates one of the balancing resistors 278G mounted on a resistance mounting board 310 and electrically connected by means of the wire 176G to the photocell 134G. The opposite end of the resistor is connected to socket 172H, and the matrix 262 is plugged into the socket 172H, along with other sockets, to make electrical connection, as more clearly illustrated in FIGURES 1, 9, and 13.

FIGURE 13 illustrates the diode matrix 262 in its physical form which utilizes a cup 288 of electrically insulating material having a cylindrical outer wall 290 of the same diameter as the diameter of the shell 24 of the housing 12. The cup 288 has a flat base 292 which is provided with recesses 294 extending therein from the surface confined within the cylindrical wall 290, and each of the recesses 294 contains one of the diodes of the diode sections 264A through 264N. Each recess 294 is provided with a bore 296 which extends to the opposite side of the base 292 from the recess 294 and one of the pigtail terminals of each of the diodes extends through this bore 296 to be electrically connected in the circuit of the diode matrix 262 by printed circuit techniques. In all, there are seventy recesses 294 to contain the seventy diodes of the matrix 262. Further, the resistors 274A through 274N are mounted on the base 292 within the cylindrical wall 290 of the cup 288 and connected in the matrix circuit as shown in FIGURE 11.

The cylindrical wall 290 of the cup 288 is provided with a plurality of channels 298, and outwardly extending pins 300 are anchored in the channels 298. These pins 300 are aligned with the sockets 172 of the arcuate connectors 168A, 168B, and 168C (FIGURE 8). In this manner, electrical connection is achieved from the sockets to the electronics package 20. More specifically, the photocells 134 of the photocell assembly are connected by means of these pins 300 engaging the sockets 172 to the coupling diodes 276 of the diode matrix 262.

FIGURE 1 and FIGURE 13 illustrate a plurality of posts 302 which extend from the base 292 of the cup 288 away from the arcuate connectors 168A, 168B, and 168C. The posts 302 are utilized to mount four printed circuit boards, designated 304A, 304B, 304C, and 304D which contain the flip-flop circuits 216 and 218, the flip-flop circuits 220 and 222, the amplifier 282, and power resistors, respectively. Since these elements are otherwise conventional, they will not be further described. The terminals 240, 246, 214, and 284 are in the form of pins or lugs 306 which protrude from the end of the cover 22. A separate terminal 308 is provided to provide electrical energy for the lamp 88, as indicated in FIGURE 11.

The matrix switching circuit 262 impresses a positive potential of approximately 13 volts on the junction between the first diode 276 and the group of diodes 266, 268, 270 and 272 through the resistor 274. However, this potential is available for actuation of the photocell associated with the group of diodes only during periods when the output terminals from the associated flip-flops 216, 218, and 222 are at a high impedance relative to the return terminal 246. The output terminals of the flip-flops are connected so that only one photocell is subjected to this potential at a given time, thereby interrogating that photocell. In order to make certain that the photocell will not be interrogated at other times, the common electrode of the photocell is maintained at a potential of approximately 4.5 volts applied through the input of the amplifier 282, and the balancing resistors 278 also have their common terminal connected to this potential.

An optical encoder constructed in the manner set forth herein may be fabricated in an extremely small casing. In the construction of the encoder described throughout this specification, a unit having a resolution of 8,192 divisions (13 binary digits) has been provided in a casing with a diameter of approximately one inch. The electronics to provide a useful output in sequential form is also enclosed within the cover 22 of the encoder. Further, the electronic package 20 of the encoder may be simply removed for servicing by a plug-in connector which utilizes a minimum of space.

Those skilled in the art will readily devise other uses for the present invention and utilities not here set forth. Further, the present invention may be modified by those skilled in the art based upon the teachings here set forth. It is, therefore, intended that the scope of the present invention be not limited by the foregoing disclosure, but rather only by the appended claims.

The invention claimed is:

1. An analog to digital encoder comprising a housing having a generally cylindrical wall and a plurality of posts extending from one end of the wall parallel to the axis thereof, each of said posts having a surface on a plane normal to the axis of the wall, a shaft disposed on the axis of the wall, a pair of bearing assemblies mounted on the housing and mounted about the shaft to journal the shaft on the housing, a code disc mounted on the shaft for rotation therewith and disposed on the side of the plane of the surfaces of the posts of the cylindrical wall, said code disc having a circular track coaxially disposed about the shaft and consisting of a plurality of transparent sectors separated by opaque sectors, a disc of smaller diameter than the wall provided with a flat surface and having a number of ears equal to the number of posts extending outwardly from the disc and terminating on a cylindrical surface with a diameter approximately equal to that of the outer surface of the wall, each of said ears having a surface on a plane parallel to the surface of the disc and said surface being disposed adjacent to the surface of one of the posts, a photocell mounted on the surface of the disc confronting the track of the code disc, and means for securing each of the ears on one of the posts with the surface of the disc confronting the code disc and the photocell on the disc aligned with the track of the code disc.

2. An optical encoder comprising a housing having a cylindrical shell and a cylindrical sleeve disposed coaxially within the shell, a pair of ball bearing assemblies, each assembly having an inner race and an outer race with confronting part-circular grooves and a plurality of balls rotatably disposed in said grooves, the outer race of the first of the bearing assemblies being affixed to the sleeve and the outer race of the second of said assemblies being slidably disposed in abutment with the sleeve, a shaft having a protruding head disposed within the inner races of the ball bearing assemblies, said shaft head abutting the inner race of the first ball bearing assembly on the side thereof opposite the second ball bearing assembly and said shaft being in slidable contact with the inner race of the first ball bearing assembly, a cylindrical spacer disposed between the outer races of the first and second assemblies, a cylindrical collar affixed on the shaft on the side of the second ball bearing assembly opposite the first ball bearing assembly and abutting the inner race of the second ball bearing assembly, the ball bearings of both assemblies being maintained under pressure between the head of the shaft and the collar, a code disc mounted coaxially on the shaft having a coaxial track of transparent and opaque segments, a light source mounted on the housing between the sleeve and the shell thereof confronting a portion of the track of the code disc, and a photocell mounted on the shell of the housing on the side of the code disc opposite the light source confronting the light source.

3. An analog to digital encoder comprising a housing having a generally cylindrical wall and a plurality of posts extending from one end of the wall parallel to the axis thereof, each of said posts having a surface on a plane normal to the axis of the wall, a shaft disposed on the axis of the wall, a pair of bearing assemblies mounted on the housing and mounted about the shaft to journal the shaft on the housing, a code disc mounted on the shaft for rotation therewith and disposed adjacent to the end of the wall confronting the plane of the surfaces of the posts, said code disc having a plurality of circular tracks coaxially disposed about the shaft and consisting of a plurality of transparent sectors separated by opaque sectors, a disc of smaller diameter than the wall provided with a flat surface and having a number of ears equal to the number of posts extending outwardly from the disc and terminating on a cylindrical surface with a diameter approximately equal to that of the outer surface of the wall, each of said ears having a surface on a plane parallel to the surface of the disc and said surface being disposed adjacent to the surface of one of the posts, a plurality of photocells mounted on the surface of the disc, each photocell confronting a different track of the code disc, means for securing each of the ears on one of the posts with the surface of the disc confronting the code disc, and a light source disposed on the side of the disc opposite the photocells.

4. An analog to digital encoder comprising the elements of claim 3 wherein the means for mounting the bearing assemblies on the housing comprises a cylindrical sleeve integral with the housing and disposed coaxially within the wall of the housing, the shaft and bearing assemblies being disposed within the sleeve and the bearing assemblies being in abutment with the interior surface of the sleeve.

5. An analog to digital encoder comprising a housing having a generally cylindrical wall and a sleeve having a cylindrical inner surface disposed coaxially within the wall, said housing having a plurality of posts extending from one end of the wall parallel to the axis thereof, each of said posts having a surface on a plane normal to the axis of the wall and spaced from the confronting end of the sleeve, a shaft disposed within the sleeve on the axis of the wall having a protruding head at one end thereof, a pair of bearing assemblies each having a cylindrical outer race and a cylindrical inner race with confronting part-circular grooves and a plurality of balls disposed in the grooves, the inner race of one bearing assembly abutting the head of the shaft and the inner race of the other assembly being secured on the shaft, the outer races of the assemblies being in slidable abutment with the surface of the sleeve and maintained at a fixed distance from each other, a code disc coaxially mounted on the head of the shaft for rotation therewith and disposed between the plane of the surfaces of the posts and the end of the sleeve of the housing, said code disc having a plurality of circular tracks coaxially disposed about the shaft and consisting of a plurality of transparent sectors separated by opaque sectors, a disc of smaller diameter than the wall provided with a flat surface and having a number of ears equal to the number of posts extending outwardly from the disc and terminating on a cylindrical surface with a diameter approximately equal to that of the outer surface of the wall, each of said ears having a surface on a plane parallel to the surface of the disc and said surface being disposed in abutment with the surface of one of the posts, a photocell mounted on the surface of the disc confronting each track of the code disc and each photocell being aligned with one track of the code disc, and a light source disposed on the side of the disc opposite the photocells.

6. An analog to digital encoder comprising the combination of claim 5 wherein the wall of the housing is provided with an aperture therein and the light source comprises an arcuate strip having a radius of curvature equal to that of the wall of the housing and a collar extending toward the axis of the arcuate strip adapted to snugly fit within the aperture of the wall, a lamp disposed within the collar having a cross section smaller than the collar, and a mass of cement disposed between the collar and the lamp to secure the lamp in position.

7. An analog to digital encoder comprising the combination of claim 6 wherein two electrical contacts are mounted on the wall of the housing confronting the strip and electrically connected to a source of electrical current, and two electrical terminals are mounted on the arcuate strip adapted to mate with the contacts on the wall, said terminals being electrically insulated from each other and connected to the terminals of the lamp.

8. An analog to digital encoder comprising the combination of claim 6 wherein the housing is provided with a circular ridge extending coaxially from the cylindrical wall thereof on the side of the aperture opposite the disc, in combination with a cover having a cylindrical wall open at one end disposed about the housing and snugly engaging the ridge, said wall being closely adjacent to the surface of the arcuate strip remote from the housing.

9. An analog to digital encoder comprising a housing having a generally cylindrical wall and a plurality of posts extending from one end of the wall parallel to the axis thereof, each of said posts having a surface on a plane normal to the axis of the wall, a shaft disposed on the axis of the wall, a pair of bearing assemblies mounted on the housing and mounted about the shaft to journal the shaft on the housing, a code disc mounted on the shaft for rotation therewith and disposed on the side of the plane of the surfaces of the posts of the cylindrical wall, said code disc having a plurality of circular tracks coaxially disposed about the shaft at different distances therefrom, each track consisting of a plurality of transparent sectors separated by opaque sectors, a disc of smaller diameter than the wall provided with a flat surface and having a number of ears equal to the number of posts extending outwardly from the disc and terminating on a cylindrical surface with a diameter approximately equal to that of the outer surface of the wall, each of said ears having a surface on a plane parallel to the surface of the disc and said surface being disposed in abutment with the surface of one of the posts, a plurality of photocells mounted on the surface of the disc confronting the code disc, a photocell confronting each track of the code disc, and means for securing each of the ears on one of the posts with the surface of the disc confronting the code disc and the photocell on the disc aligned with the track of the code disc, a connector mounted on the housing between two of the posts thereof, said connector having an outer surface curved to form a segment of a cylinder having a radius approximately equal to the wall of the housing and flat edge surfaces normal to the axis of the outer surface, said connector being mounted on the housing with one of the edge surfaces abutting the end of the wall adjacent the posts, said connector having a plurality of channels extending between the flat edge surfaces thereof, and mating with channels in the end of the wall of the housing communicating with the interior of the cylindrical wall of the housing, a plurality of balancing resistors mounted within the cylindrical wall of the housing, and a plurality of electrical conductors, each conductor being connected to one of the balancing resistors at one end, extending through one of the channels of the wall of the housing and the mating channel of the connector, and being connected to one of the photocells at the other end.

10. An analog to digital encoder comprising a housing having a generally cylindrical wall, a shaft disposed on the axis of the wall, a pair of bearing assemblies mounted on the housing and mounted about the shaft to journal the shaft on the housing, a code disc disposed within the cylindrical wall and mounted on the shaft for rotation therewith, said code disc having a diameter slightly less than the diameter of the cylindrical wall and a plurality of circular tracks coaxially disposed about the shaft, each track of the code disc consisting of a plurality of transparent sectors separated by opaque sectors, a plurality of photocells mounted on the housing on one side of the code disc, each photocell confronting a different track of the code disc, and a light source disposed within the wall on the other side of the code disc confronting the photocells, a plurality of balancing resistors mounted within the wall of the housing between the bearing assemblies and the wall, said wall having a plurality of channels therein equal to the number of balancing resistors disposed parallel to the axis of the wall and communicating at opposite ends with the regions within the housing on opposite sides of the code disc, a plurality of electrical connectors, each connector being connected at one end to one of the balancing resistors, extending through one of the channels of the wall and being connected at the other end to one of the photocells.

11. An analog to digital encoder comprising the combination of claim 10 in combination with an electronic interrogation unit for the photocells mounted on the housing on the side of the photocells opposite the code disc, said interrogation unit having a plurality of output terminals equal in number to the number of photocells, and the wall of the housing a plurality of ducts extending therethrough parallel to the axis of the wall from the region of the interrogation unit to the region of the balancing resistors, and an electrical connector disposed in each of the ducts and electrically connected at one end to one of the balancing resistors and at the other end to one of the output terminals of the interrogation unit.

12. An analog to digital encoder comprising a housing having a generally cylindrical wall, an end wall extending across one end of the cylindrical wall having an axial opening extending therethrough, and a sleeve having a cylindrical inner surface disposed coaxially within the cylindrical wall communicating with the opening, said housing having a plurality of posts extending from the end wall parallel to the axis of the cylindrical wall, each of said posts having a surface on a plane normal to the axis of the cylindrical wall, a shaft disposed within the sleeve on the axis of the cylindrical wall having one end disposed adjacent to the end wall, a pair of bearing assemblies mounted within the sleeve and journaling the shaft, a code disc coaxially mounted on the end of the shaft for rotation therewith, and said code disc having a diameter slightly less than the inner diameter of the cylindrical wall and having a plurality of circular tracks of different diameter coaxially disposed about the shaft, each track consisting of a plurality of transparent sectors separated by opaque sectors, a disc of smaller diameter than the wall provided with a flat surface and having a number of ears equal to the number of posts extending outwardly from the disc and terminating on a cylindrical surface with a diameter approximately equal to that of the outer surface of the wall, each of said ears having a surface on a plane parallel to the flat surface of the disc and said surface of each ear being disposed in abutment with the surface of one of the posts, a photocell mounted on the surface of the disc confronting each track of the code disc, each of said photocells being disposed on the same radius of the disc, means for securing each of the ears on one of the posts with the surface of the disc confronting the code disc and each photocell being aligned with one track of the code disc, the end wall of the housing having a slot extending therethrough confronting the photocells on the disc, a light source disposed within the housing between the cylindrical wall and the sleeve thereof confronting the slot in the end wall of the housing, a plurality of balancing resistors equal in number to the number of photocells on the disc, means for mounting each of the balancing resistors between the cylindrical wall and the sleeve of the housing, said housing having a circular groove on the exterior surface thereof and a plurality of apertures extending through the wall from the groove, a connector mounted on the housing between two of the posts thereof, said connector having an outer surface curved to form a segment of a cylinder with a radius approximately equal to the radius of the wall of the housing and a flat edge surface normal to the axis of the outer surface, said connector being mounted on the housing with one of the edge surfaces abutting the end wall adjacent to the posts, said connector having a plurality of channels extending between the flat edge surfaces thereof and mating with channels in the end wall and cylindrical wall of the housing communicating with the circular groove of the housing, a plurality of electrical connectors, each connector being connected to one of the balance resistors at one end, extending through one of the apertures in the cylindrical wall, one of the channels of the wall, the mating channel of the connector, and being connected to one of the photocells at the other end.

13. An analog to digital encoder comprising the elements of claim 12 wherein the connector is provided with a plurality of ducts, each duct extending therethrough parallel to and adjacent to a channel, an electrically conducting jack disposed in each duct confronting the flat edge surface remote from the end wall of the housing, the end wall and cylindrical wall of the housing being provided with a duct mating with each duct of the connector and communicating with the groove in the exterior surface of the cylindrical wall, an electrical conductor extending from each jack through the duct of the connectors, the duct of the end wall and cylindrical wall and an aperture in the cylindrical wall, each of said electrical conductors being electrically connected at one end to one of the jacks of the connector and at the other end to one of the balancing resistors, and an interrogation unit having a plurality of output terminals in the form of plugs, each of said plugs engaging one of the jacks of the connector.

14. An analog to digital encoder comprising the combination of claim 13 wherein the interrogation unit is assembled on a cup-shaped base having a cylindrical outer wall and the terminal plugs of said interrogation unit extend outwardly from the cylindrical wall parallel to each other and to the axis of said wall, said plugs being aligned with the jacks of the connector.

15. An analog to digital encoder comprising the combination of claim 14 in combination with an amplifier mounted on the base of the interrogation unit on the side thereof remote from the code disc, said amplifier having an input terminal electrically connected to each of the photocells.

No references cited.

MAYNARD R. WILBUR, *Primary Examiner.*

A. L. NEWMAN, *Assistant Examiner.*